United States Patent
Mosse et al.

(10) Patent No.: US 10,983,246 B2
(45) Date of Patent: Apr. 20, 2021

(54) THERMAL MATURITY ESTIMATION VIA LOGS

(71) Applicant: Schlumberger Technology Corporation, Sugar Land, TX (US)

(72) Inventors: Laurent Mosse, Buenos Aires (AR); Erik Rylander, Frisco, TX (US); Paul Craddock, Scituate, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 30 days.

(21) Appl. No.: 14/977,336

(22) Filed: Dec. 21, 2015

(65) Prior Publication Data

US 2017/0176639 A1 Jun. 22, 2017

(51) Int. Cl.
| | |
|---|---|
| *G01V 99/00* | (2009.01) |
| *G01V 3/32* | (2006.01) |
| *G01V 11/00* | (2006.01) |
| *E21B 49/08* | (2006.01) |
| *E21B 1/00* | (2006.01) |

(52) U.S. Cl.
CPC .............. *G01V 99/005* (2013.01); *G01V 3/32* (2013.01); *G01V 11/00* (2013.01); *E21B 1/00* (2013.01); *E21B 49/088* (2013.01)

(58) Field of Classification Search
CPC ........ G01V 99/005; G01V 3/32; G01V 11/00; E21B 49/00; E21B 49/088; E21B 1/00; G06F 17/11
USPC .......................................................... 702/11
See application file for complete search history.

(56) References Cited

U.S. PATENT DOCUMENTS

| | | | | |
|---|---|---|---|---|
| 8,279,409 | B1* | 10/2012 | Sezginer | G03F 1/70 355/67 |
| 2002/0081742 | A1* | 6/2002 | Mirotchnik | G01N 33/2823 436/60 |
| 2003/0080604 | A1* | 5/2003 | Vinegar | E21B 43/243 299/14 |
| 2007/0280555 | A1* | 12/2007 | Chen | G06T 3/0081 382/294 |
| 2010/0228485 | A1* | 9/2010 | Betancourt | G01V 11/00 702/13 |
| 2011/0068788 | A1* | 3/2011 | Minh | G01V 3/18 324/303 |
| 2011/0246143 | A1* | 10/2011 | Pomerantz | E21B 49/00 703/2 |

(Continued)

OTHER PUBLICATIONS

Smernik et al "Assessing the quantitative reliability of solid-state 13C NMR spectra of kerogens across a gradient of thermal maturity", 2006, Solid State Nuclear Magnetic Resonance, 29. (Year: 2006).*

(Continued)

*Primary Examiner* — Patricia D Reddington
(74) *Attorney, Agent, or Firm* — Trevor G. Grove (57) ABSTRACT

The systems and methods provided herein relate to extracting maturity-based properties from input log data obtained by a downhole well logging tool. A maturity inversion is performed using the input log data, a log response model, and at least one maturity model to extract maturity-based properties from the input log data. The maturity-based properties are provided in an output log, such that subsequent down hole operation of the formation may account for the maturity-based properties.

19 Claims, 10 Drawing Sheets

(56) References Cited

U.S. PATENT DOCUMENTS

| | | | |
|---|---|---|---|
| 2012/0268074 A1* | 10/2012 | Cooley | H01G 11/58 320/130 |
| 2013/0112406 A1* | 5/2013 | Zuo | E21B 49/10 166/250.08 |
| 2013/0113480 A1* | 5/2013 | Kadayam Viswanathan | G01V 3/32 324/303 |
| 2013/0262069 A1* | 10/2013 | Leonard | E21B 43/00 703/10 |
| 2014/0184230 A1* | 7/2014 | Anderson | G01N 15/088 324/376 |
| 2014/0200810 A1* | 7/2014 | Zuo | E21B 49/10 702/13 |
| 2014/0229112 A1* | 8/2014 | Datey | E21B 47/00 702/7 |
| 2014/0305640 A1* | 10/2014 | Wellington | E21B 43/243 166/272.1 |
| 2016/0231461 A1* | 8/2016 | Galford | G01V 3/32 |

OTHER PUBLICATIONS

Vandenbrouke M., and Largeau C., 2007, Kerogen Origin, evolution and structure, Organic Geochemistry, 38, pp. 719-833.

Le-Doan et al., 2013, Green River Oil Shale Pyrolysis: Semi-Open Conditions. 2013, Energy & Fuesl, 27, pp. 6447-6459.

Lewan M.D. et al., 2002, Material-balance Assessment of the New Albany-Chesterian Petroleum System of the Illinois Basin, AAPG Bulletin, 86(5), pp. 745-777.

Alfred D. et al., 2013, A New Petrophysical Model for Organic Shales, Petrophysics, vol. 54 (3), pp. 240-247.

Jarvie, D., et al., Geochemical Charateristics of the Devonian Woodford Shale, Oklahoma Gas Shale Conference, Oklahoma, Oct. 22, 2008 (23 pages).

Zhao et al., 2007, Thermal Maturity of the Barnett Shale Determined from Well-log Analysis, AAPG Bulletin, 91(4), pp. 535-549.

LeCompte B. et al., Quantifying Source Rock Maturity from Logs: How to get more than TOC from Delta Log R. SPE 133128, Annual Technical Conference and Exhibition, Florence, Italy, Sep. 19-22, 2010 (10 pages).

Passey, Q.R. et al, 1990, A Practical Model for Organic Richness from Porosity and Resistivity Logs, AAPG Bulletin, 74, pp. 1777-1794.

Poupon A., et al., 1970, Log Analysis of Sand-Shale sequence—A Systematic Approach, J. Petroleum Technology, 22, pp. 867-881.

\* cited by examiner

THERMAL MATURITY ESTIMATION VIA LOGS

BACKGROUND

The disclosure relates to an apparatus and method of shale formation evaluation. More specifically, this disclosure relates to dynamic thermal maturity determination, which may aid in shale play evaluation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Numerous well logging tools are used to identify characteristics of geological formations where wells are drilled. For example, properties such as a density and/or photoelectric factors of the formation may be measured by downhole well-logging tools. Thermal maturity may be a factor in shale play evaluation. Thermal maturity of an oil or gas shale describes a degree to which the organic matter of the shale has been altered by geothermal heating. When an oil shale is heated, the organic material may thermally decompose to form oil and gas. Accordingly, maturity may help in evaluating factors such as: hydrocarbon type, porosity, pore size distribution, water saturation, bitumen content, clay type, kerogen density, and so forth.

Maturity may be measured on a core sample and/or is sometimes inferred from mud logging. The measured maturity is then used to find observable patterns in logs (e.g., measurements of downhole logging tools). Maturity may vary at the various vertical positions of the shale play. Despite these variations in maturity within the shale play, analysts may fix maturity properties based on a-priori knowledge and experience. Unfortunately, because these traditional methods may not account for vertical variations in maturity, the accuracy of the shale play evaluations may be negatively impacted. For example, in shale plays with thick organic-rich intervals, such as the Vaca-Muerta formation in Argentina, the resulting accuracy of volumetric estimations (e.g., porosity, saturation, etc.) may suffer when not accounting for variations in shale play maturity.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The current disclosure provides a new technique where kerogen and hydrocarbon properties are not assumed to be fixed during the shale play evaluation. Accordingly, the natural variability of these parameters may be extracted, resulting in more accurate volumetric estimation. The techniques discussed herein may improve petrophysical interpretation in organic-rich mudstones, or shale plays, as well as conventional plays, where variations of fluid type is expected.

Accordingly, embodiments of the disclosure relate to combining continuous log measurements, obtained via a logging tool, with a kerogen and hydrocarbon fluid property model that allows, using an algorithmic inversion of a comprehensive log response model combined with a tool response model and/or maturity property models, estimation of the volumes of different constituents in the geological formation and properties of kerogen and of different types of hydrocarbon present in the formation. Because the evaluation does not rely on input derived from a-priori knowledge of maturity, but instead utilizes a dynamic estimation input at various vertical positions, subsequent evaluation/operation that relies on this input may be improved. For example, subsequent post processing using the maturity properties may improve petrophysical parameters (e.g., volume measurements and/or other parameters) and may improve sonic velocities interpretation. In some embodiments, maturity indicators such as vitrinite reflectance and pyrolysis HI may be derived from these properties.

In one embodiment, a method includes: when a downhole logging tool is at a desired logging depth, obtaining input log data via the downhole logging tool; performing a maturity inversion using the input log data, a log response model, and at least one maturity model, to extract maturity-based properties from the input log data; and providing the maturity-based properties in an output log, such that subsequent down hole operation of the formation may account for the maturity-based properties.

In a second embodiment, a well-logging system includes: a downhole logging tool configured to capture one or more input logs at a current vertical position of the downhole logging tool in a borehole of a formation; and a data processing system that includes circuitry. The circuitry performs a maturity inversion using the input log data, a log response model, and at least one maturity model, to extract maturity-based properties from the input log data; and provides the maturity-based properties in an output log, such that subsequent down hole operation of the formation may account for the maturity-based properties.

In a third embodiment, a tangible, non-transitory, machine readable medium, includes machine readable instructions to: perform a maturity inversion using input log data obtained by a downhole logging tool at a particular vertical position of the downhole logging tool in a borehole of a formation, a log response model, and at least one maturity model, to extract maturity-based properties from the input log data; and provide the maturity-based properties in an output log, such that subsequent down hole operation of the formation may account for the maturity-based properties.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Many downhole tools are used for logging wells to obtain measurements of the formation supporting the wells. As mentioned above, traditional formation evaluation may rely on fixed maturity properties that are based on a-priori knowledge and/or experience. Since these properties may vary with vertical depth, fixing these properties may negatively impact formation evaluation. Accordingly, this disclosure describes systems and methods that may increase accuracy of formation evaluation (e.g., volumetric estimation) by extracting (e.g., simultaneously with other log data) maturity properties (e.g., kerogen and hydrocarbon properties), which may be used in subsequent evaluation.

Figure 1:
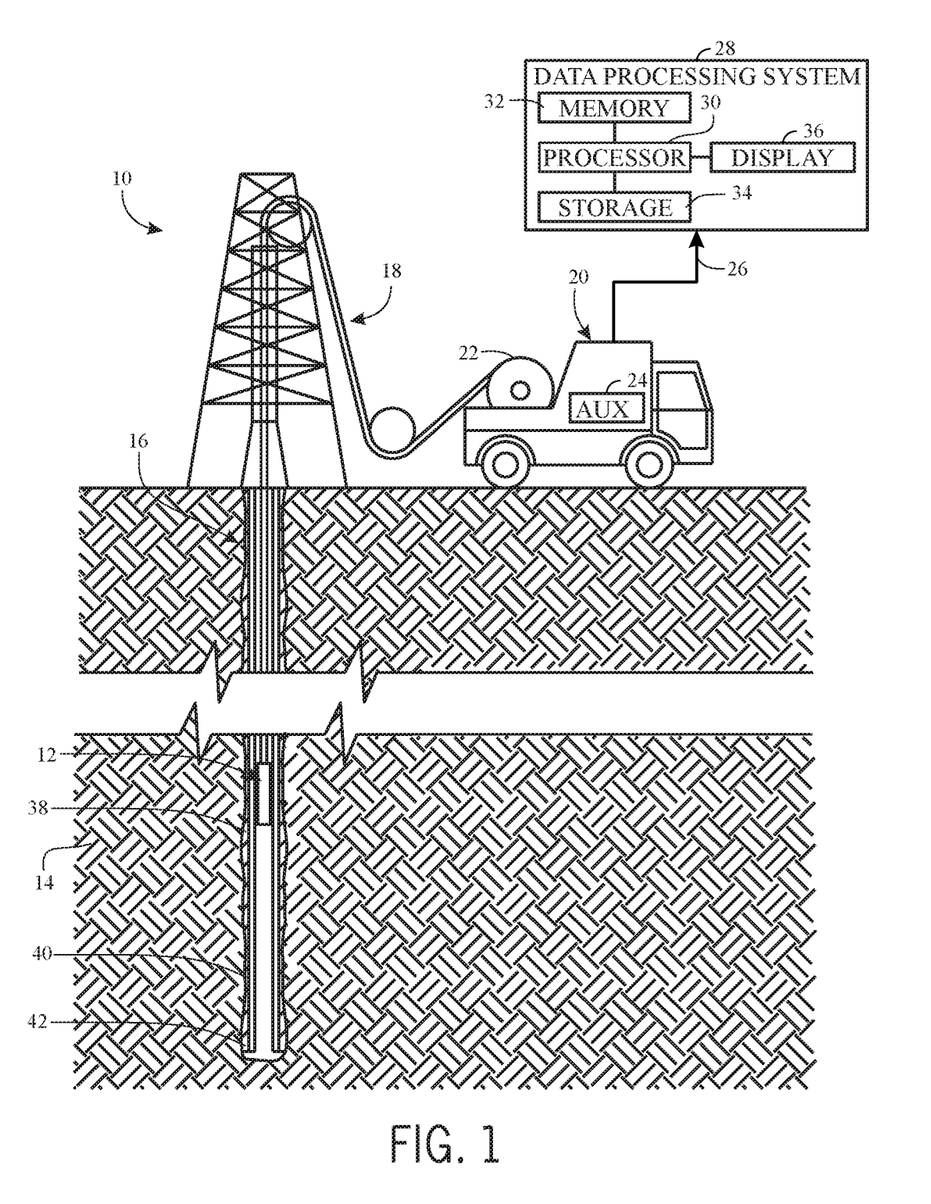
FIG. 1 is a schematic diagram of a well-logging system that calculates variable measurements affected by thermal maturity at varied depths of a formation, in accordance with an embodiment.

With this in mind, FIG. 1 is a schematic diagram illustrating a well-logging system 10 that may obtain dynamic maturity properties at variable depths of a formation, in accordance with an embodiment. The well-logging system 10 may be conveyed through a geological formation 14 via a wellbore 16. The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that obtains multidimensional measurements through depths of the wellbore 16.

Many types of downhole tools may obtain measurements in the wellbore 16. For each depth of the wellbore 16 that is measured, the downhole tool 12 may generate log data (e.g., density and/or photoelectric factor measurements). The downhole tool 12 may provide such measurements 26 to a data processing system 28 via any suitable telemetry (e.g., via electrical signals pulsed through the geological formation 14 or via mud pulse telemetry). The data processing system 28 may process the measurements 26 to identify patterns in the measurements 26. The patterns in the multi-dimensional measurements 26 may indicate certain properties of the wellbore 16 (e.g., porosity, permeability, relative proportions of water and hydrocarbons, and so forth) that would be otherwise indiscernible by a human operator.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties of the wellbore 16 based on the multidimensional measurements 26.

As will be discussed in more detail below, the data processing system 28 (or processing circuitry of the downhole tool 12) may use the measurements 26 to determine maturity model properties that may vary at varied vertical positions of the wellbore 16. These maturity model properties may provide additional desirable data for use in wellbore 16 evaluation. For example, a direct estimation of shale play thermal maturity may be obtained at various depths 38, 40, and 42 of the wellbore 16 using log data.

Figure 2:
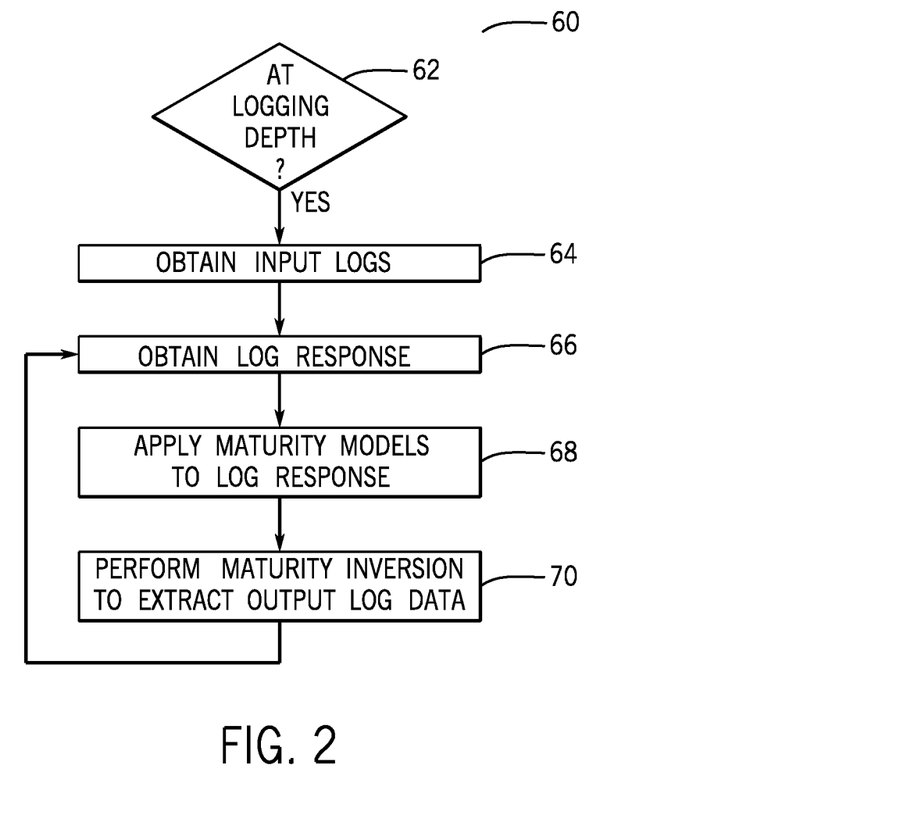
FIG. 2 is a flowchart that illustrates a process for determining maturity properties, in accordance with an embodiment.
Figure 3:
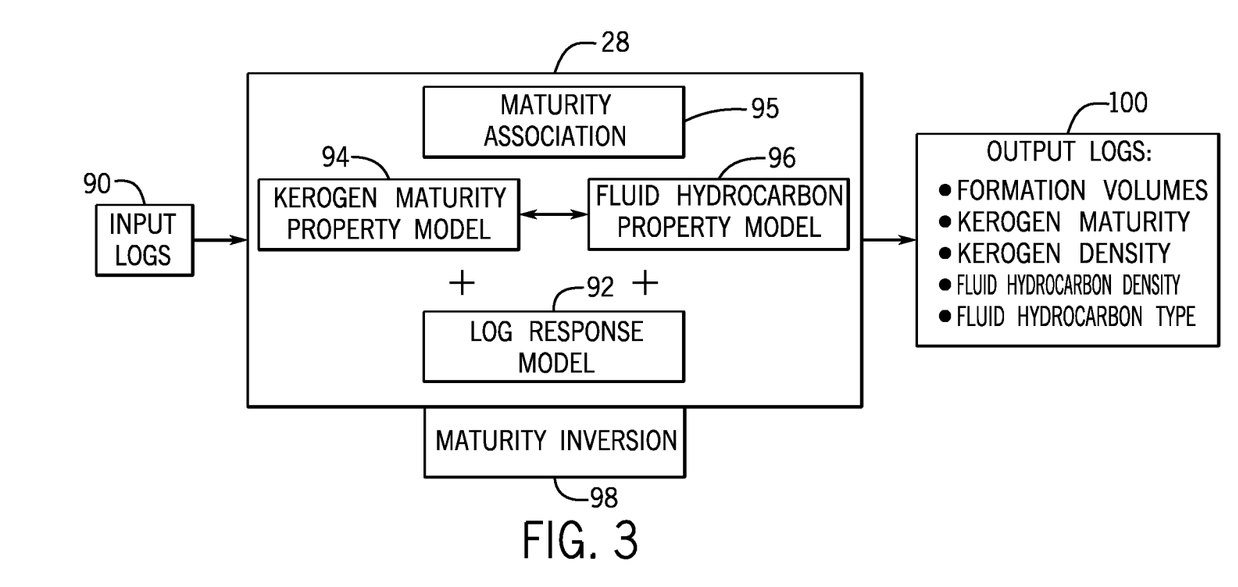
FIG. 3 is a schematic diagram illustrating the transformation of the input logs into output logs using maturity models, in accordance with an embodiment.

Turning to a more detailed explanation of the direct estimation of the thermal maturity, FIG. 2 is a flowchart that illustrates a process 60 for determining maturity properties and FIG. 3 is a schematic diagram illustrating the transformation of the input logs 90 into output logs 100 using maturity models. For clarity, FIGS. 2 and 3 will be discussed together.

As mentioned above, by using the downhole tool 12 (e.g., a logging tool) data (e.g., measurements 26) and certain maturity models, a direct estimation of thermal maturity of the formation 14 at various positions of borehole 16. The process 60 provides an embodiment of processing steps, which, when implemented by processing circuitry, may directly estimate thermal maturity. In some embodiments, the data processing system 28 may implement the process 60. Alternatively and/or additionally, processing circuitry of the downhole tool 12 may implement each block of the process 60 or a portion of the process 60.

Input Logs and Log Response Model

The process 60 begins by determining if the downhole tool 12 is at the logging depth (decision block 62). For example, when maturity estimation is desired at position 38 (of FIG. 1), the logging depth may be the depth at position 38.

Once the downhole tool 12 is at the logging depth, input logs 90 are obtained (block 64). The input logs 90 may include, for example, bulk density, hydrogen index, nuclear magnetic resonance (NMR) total porosity, total organic carbon weight fraction, water volume (e.g., derived based upon resistivity measurements, dielectric dispersion measurements, or other method), matrix properties that include matrix density and HI, etc. Further, the logs 90 may include NMR bin porosity of factor volumes, formation sigma and matrix sigma, permittivity and conductivity dispersion, etc.

Once the input logs 90 are obtained, the log response may be obtained (block 66) by applying the input logs 90 to the log response model 92. The following discussion provides equations that may be used in the response model 92. For example, in one embodiment, formation volumes may serve as input log data for the log response model 92. A formation 14 model may include a mineral matrix, kerogen, bitumen, light hydrocarbon, and water. In the below equations, ma represents the mineral matrix, K represents the Kerogen, B represents the Bitumen, hc represents the light hydrocarbon, and w represents the water. Further, $\rho$ represents density, $\phi$ represents fractional volumes, HI represents hydrogen index, $\chi$ represents carbon weight fraction, and $\Sigma$ represents a macroscopic thermal neutron capture cross section. In certain embodiments, the response function for bulk density measurements of the input log 90 may be represented as:

$$\rho_b = \rho_{ma}^* \phi_{ma} + \phi_w \rho_w^* + \rho_K^* \phi_K + \rho_{hc}^* \phi_{hc} + \rho_B^* \phi_B$$

Component densities have the subscript * to indicate that, in certain embodiments, they are obtained from a gamma-gamma density tool, (e.g., derived from electronic density using a known relationship. These component densities may vary slightly from actual component densities used in the other response equations discussed below.

The linear hydrogen index response may be represented as:

$$HI = \phi_{ma} HI_{ma} + \phi_w HI_w + \phi_K HI_K + \phi_{hc} HI_{hc} + \phi_B HI_B$$

This representation assumes that the input is hydrogen index, which may differ from some traditional neutron measurements. Accordingly, certain transformations may be applied to obtain a hydrogen index.

The nuclear magnetic resonance porosity response may be represented as:

$$MRP = \phi_w HI_w + \phi_{hc} HI_{hc} + \lambda \phi_B HI_B$$

The factor $\lambda$ may account for varying amounts of bitumen that may not be detected by the particular nuclear magnetic resonance tool design used in the collection of the input logs 90.

The water volume response function may be represented as:

$$\phi_w$$

The water volume measurement can vary. For example, when dielectric dispersion measurements produce the water volume, then a special processing may be triggered.

More specifically, dielectric dispersion measurement may be included via two separate methods. In a first "interpreted" method, the water volume origin is dielectric dispersion, which triggers the special processing. In certain embodiment, in this "interpreted" method, the kerogen permittivity may be fixed while deriving the water volume from dielectric dispersion. However, the kerogen permittivity may vary based upon its maturity. As a result, the self-coherency of the maturity inversion may not be accurate if this potential variation is not taken into account. Accordingly, the petrophysical model, together with kerogen permittivity, mineral matrix permittivity, and water salinity used to derive the water volume, may be provided as parameters of the maturity inversion. The Jacobean matrix of the petrophysical mode may then be computed and a local linearity of the model is assumed to dynamically adjust the water volume from maturity variations through the maturity inversion process.

Otherwise, when a direct dispersion method is used, where the water volume origin is not the dielectric dispersion, a choice of petrophysical model and water salinity may be entered as parameters of the maturity inversion. The estimation of water volume from dielectric dispersion can then be considered as an additional equation of the system, which may be solved dynamically.

The inclusive downhole total organic carbon (TOC) measurement response function may be represented as follows:

$$TOC = \frac{\rho_K \phi_K \chi_K + \rho_{hc} \phi_{hc} \chi_{hc} + \rho_B \phi_B \chi_B}{\rho_{ma} \phi_{ma}}$$

This function includes the sum of carbon contributions from kerogen plus bitumen plus light hydrocarbons. The weight normalization may correspond to a specific tool definition, but may vary.

Matrix properties may be represented as:

$$\rho_{ma}, HI_{ma}$$

An example of an optional alternate input, namely the thermal neutron capture cross section, may be represented as:

$$\Sigma_F = \phi_{ma} \Sigma_{ma} + \phi_w \Sigma_w + \phi_K \Sigma_K + \phi_{hc} \Sigma_{hc} + \phi_B \Sigma_B,$$

Additionally, the volume closure response function may be represented as:

$$1 = \phi_{ma} + \phi_w + \phi_K + \phi_{hc} + \phi_B$$

Once the log response is obtained, maturity models may be applied to the log response (block 68). For example, a kerogen maturity property model 94 and/or a fluid hydrocarbon property model 96 may be applied to the log response and/or log response model 92. In one embodiment, a kerogen density may serve as input log data for the kerogen maturity property model 94 and/or a fluid hydrocarbon density may serve as input log data for the fluid hydrocarbon property model 96.

Figure 10:
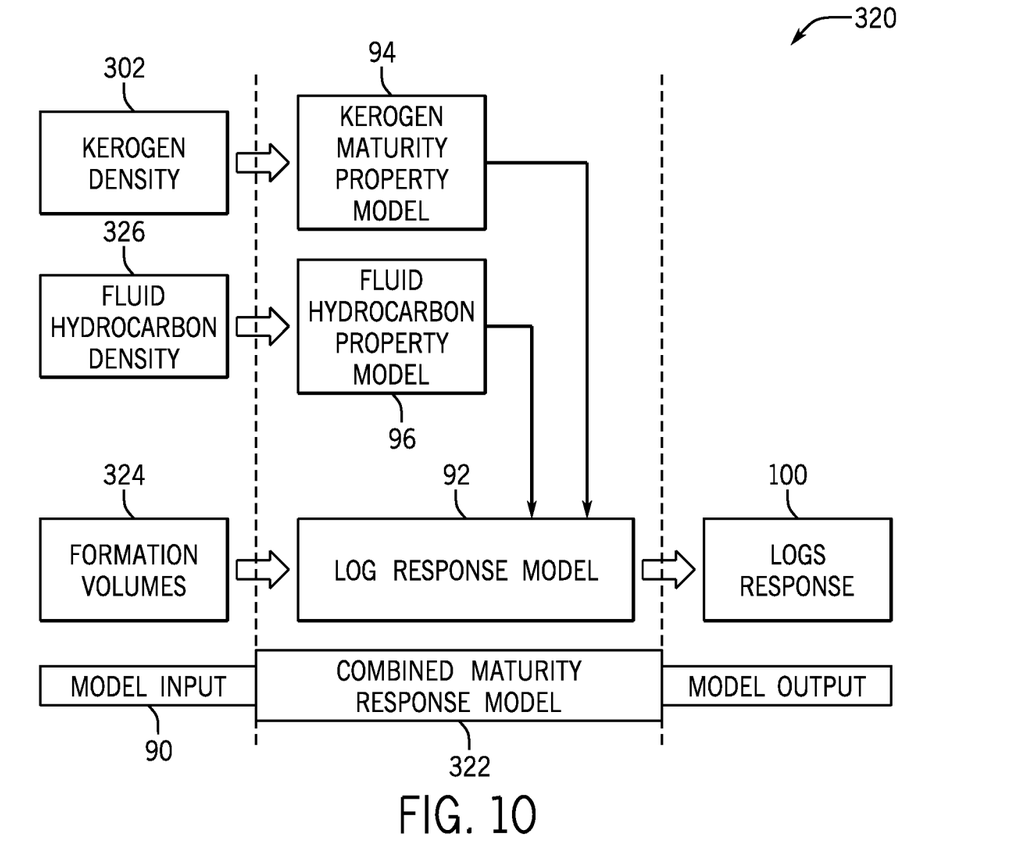
FIG. 10 is a schematic diagram illustrating usage of the global formation response model, in accordance with an embodiment.

FIG. 10 is a schematic diagram 320 illustrating usage of the global formation response model 322, in accordance with an embodiment. Collectively, the log response model 92, kerogen maturity property model 94, and fluid hydrocarbon property model 96 may be referred to as a global formation response model 322. As mentioned above, in some embodiments, the global formation response model may depend on the following parameters:

Formation volume 324: matrix, kerogen, fluid
Kerogen density 302
Hydrocarbon density 326

As previously discussed, the kerogen density 302 may be provided as an input for the kerogen maturity property model 94. Further, the fluid hydrocarbon density 326 may be provided as an input for the fluid hydrocarbon property model 96 and the formation volume 324 may be provided as an input for the log response model 92. The kerogen maturity property model 94 and the fluid hydrocarbon property model 96 may be applied to the log response model 92, defining the global formation response model 322. Using the inputs 90 and the global formation response model 322, a log response may be generated (e.g., the output logs 100).

For example, a maturity inversion 98 may be performed, using this global formation model 322 and the input logs 90, to extract data for the output logs 100. The following discussion will be broken into a discussion of the various models any their inversion using the input logs 90.

The Kerogen Maturity Property Model

Turning first to the kerogen maturity property model 94, in some embodiments, the kerogen is represented as a single bulk phase without separately quantifying the different kerogen components (e.g., macerals). Additionally or alternatively, each maceral may be quantified.

The kerogen maturity property model 94 includes several functions that relate quantitatively to the different petrophysical properties of kerogen including, but not limited to, density, hydrogen index, carbon fraction, permittivity, and sigma (thermal neutron macroscopic capture cross section).

The kerogen maturity property model 94 functions are derived from measured data, core measurements, and/or cuttings measurements. In one embodiment, default functions may be used. However, in alternative embodiments, local optimization may be used, as the kerogen maturity property model 94 may vary slightly from play to play, depending on the original kerogen composition (i.e., kerogen type). Further, in some embodiments, the kerogen density may be the selected maturity index that drives the other kerogen properties. Geochemical maturity indices such a vitrinite reflectance may have less petrophysical relevance, and may be considered as an additional or alternate output.

Figure 9:
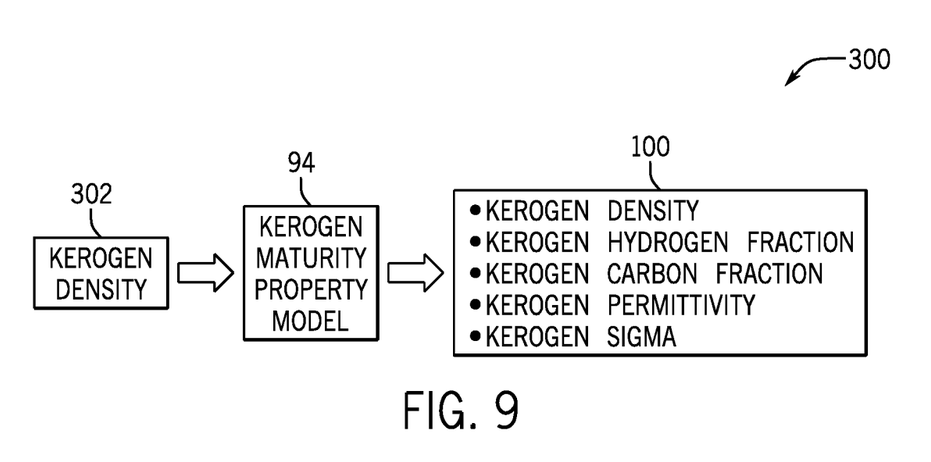
FIG. 9 is a schematic diagram illustrating usage of the kerogen maturity property model 94, in accordance with an embodiment.

FIG. 9 is a schematic diagram illustrating usage of the kerogen maturity property model 94, in accordance with an embodiment. As illustrated, kerogen density measurements 302 (e.g., input log 92 data) are provided as an input for the kerogen maturity property model 94. Using these kerogen density measurements 302, output log 100 data may be derived fro, the kerogen maturity property model 94. For example, a modified kerogen density, a kerogen hydrogen fraction, a kerogen carbon fraction, a kerogen permittivity, and/or a kerogen sigma may be derived.

Figure 4:
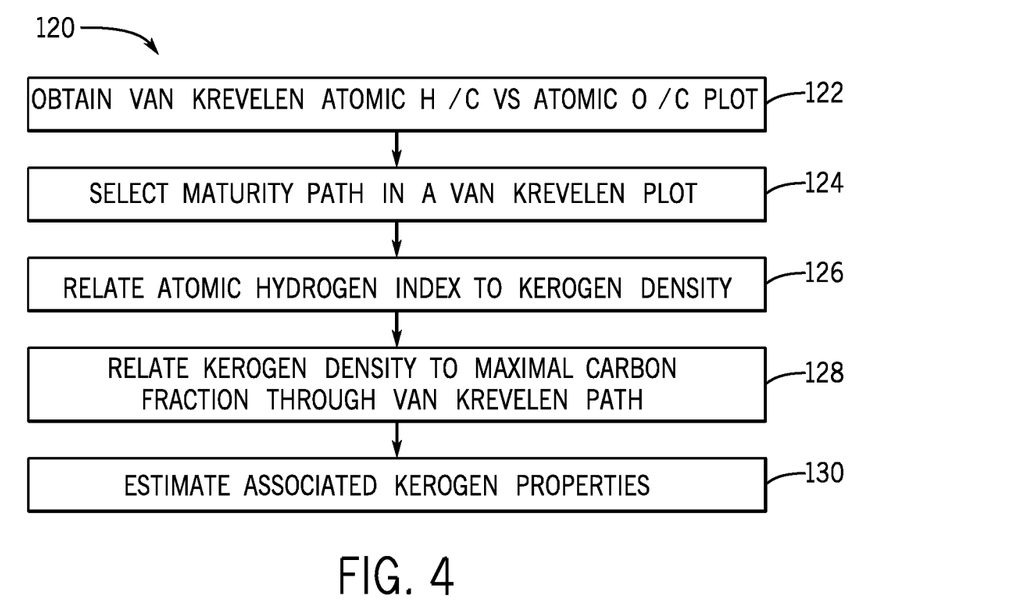
FIG. 4 is a plot diagram illustrating maturity path selection, in accordance with an embodiment.
Figure 5:
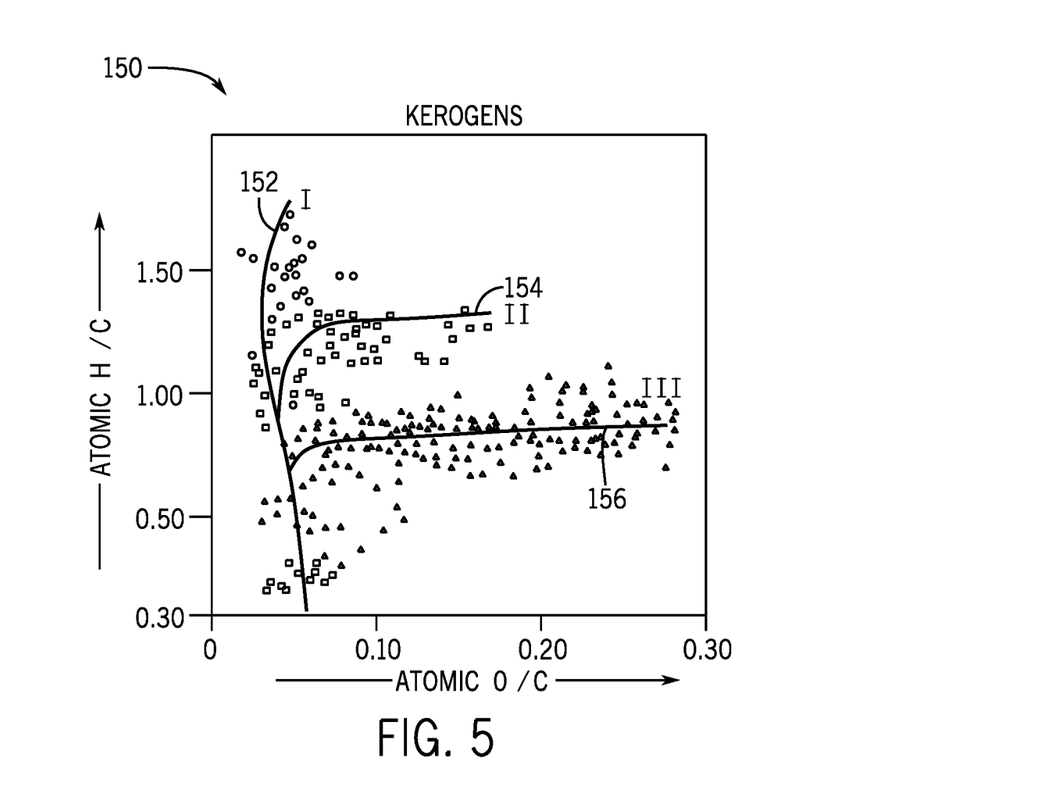
FIG. 5 is a schematic diagram illustrating an example of a Van Krevelen plot having multiple varied classifications may be provided in the plot, in accordance with an embodiment.

As mentioned above, in some embodiments, default functions of a kerogen maturity property model 94 may be used. FIG. 4 is a flowchart illustrating a process 120 that may be used to derive a default kerogen function, in accordance with an embodiment. First, a Van Krevelen atomic hydrogen to carbon (H/C) versus atomic oxygen to carbon (O/C) plot is obtained (block 122). FIG. 5 is an example of such a Van Krevelen plot 150. As illustrated, multiple varied classifications may be provided in the plot 150. For example, in the current plot three classification maturity pathways are provided. The first classification maturity pathway 152 includes a classification of the existence of algal. Further, the second classification maturity pathway 154 includes a classification of a liquid-rich kerogen (e.g., liptinite). The third classification maturity pathway 156 includes a classification of humic kerogen (e.g., vitrinite).

Once the Van Krevelen plot 150 is obtained, a particular pathway (e.g., pathway 152, 154, or 156) is selected based upon a characterization of the formation 14 (block 124). For example, if the shale play is expected to contain liquid-rich kerogen, the second classification maturity pathway 154 may be selected.

The atomic hydrogen index may be related to kerogen density (block 126). For example, in some embodiments, an empirical relationship correlating atomic H/C to the pyrolysis hydrogen index (HIp) may be used, such as:

$$HI_p = 19271.6 \left(\frac{H}{[G+H]}\right)^{6.08}$$

Further, the relationship between pyrolysis HI and vitrinite reflectance (Ro) may be used, such as:

$$Ro = -0.391 \ln(HIp) + 3.0252$$

The relationship between vitrinite reflectance (Ro) and kerogen density may also be then be used to complete the derivation of H/C versus kerogen density. For example, the relationship may be represented as:

$$\rho_K = 1.293 R_o^{0.2}$$

The relation between the kerogen H/C and kerogen total mass may be used to estimate the atomic hydrogen fraction. The selected Van Krevelen maturity path (e.g., second pathway 154 of FIG. 4) may be used to provide a maximum for the atomic hydrogen index. For example, in one embodiment, such a function may be represented as:

$$\xi_K = 0.0922 - 0.2088(\rho_K - 1.14) + 0.0768(\rho_K - 1.14)^2 + 0.0786(\rho_K - 1.14)^3,$$

where $\xi_K$ is the hydrogen mass fraction in kerogen.

Figure 6:
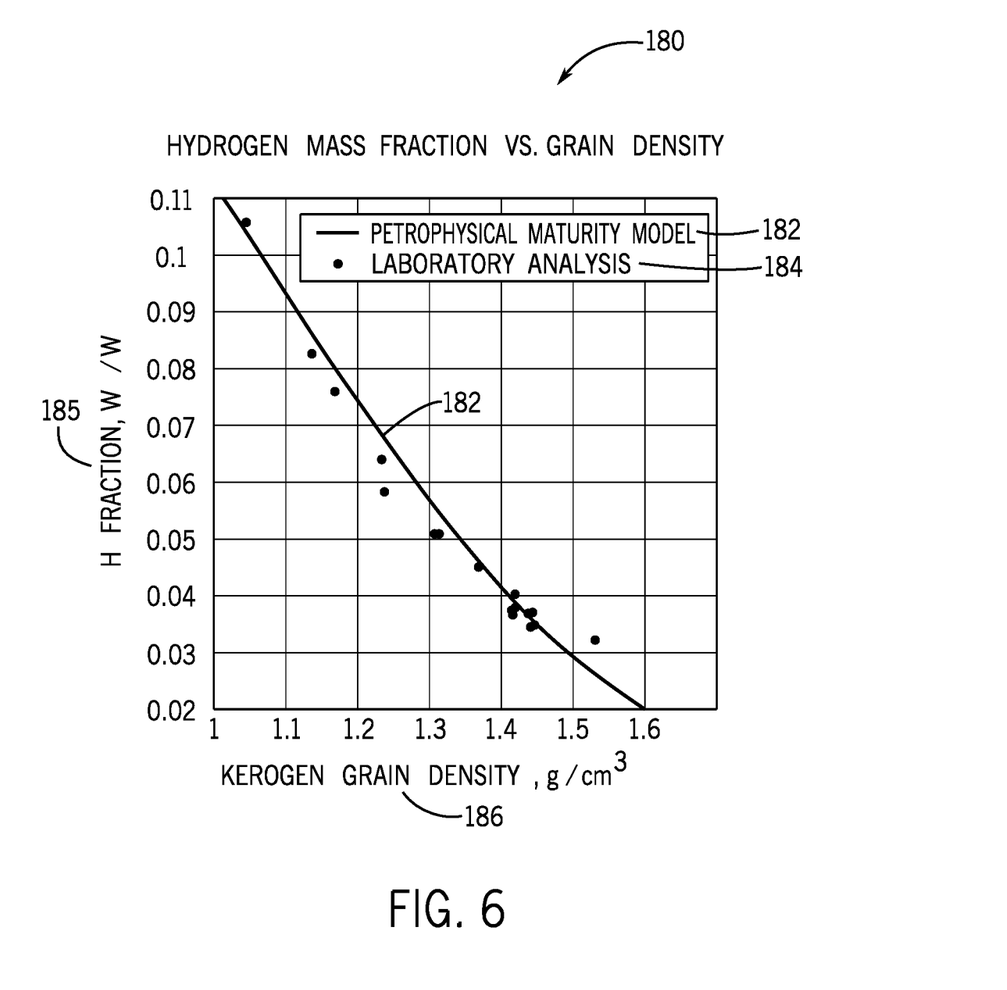
FIG. 6 is a plot diagram illustrating a correlation between H concentration (mass fraction) and density of kerogen useful in maturity inversion, in accordance with an embodiment.

FIG. 6 is a plot diagram illustrating such a correlation model (e.g., function 182), illustrating the relationship between hydrogen concentration (mass fraction 185) and density of kerogen 186 useful in maturity inversion, in accordance with an embodiment. As illustrated, the function 182 closely matches laboratory results 184, indicating an accurate function 182.

Figure 7:
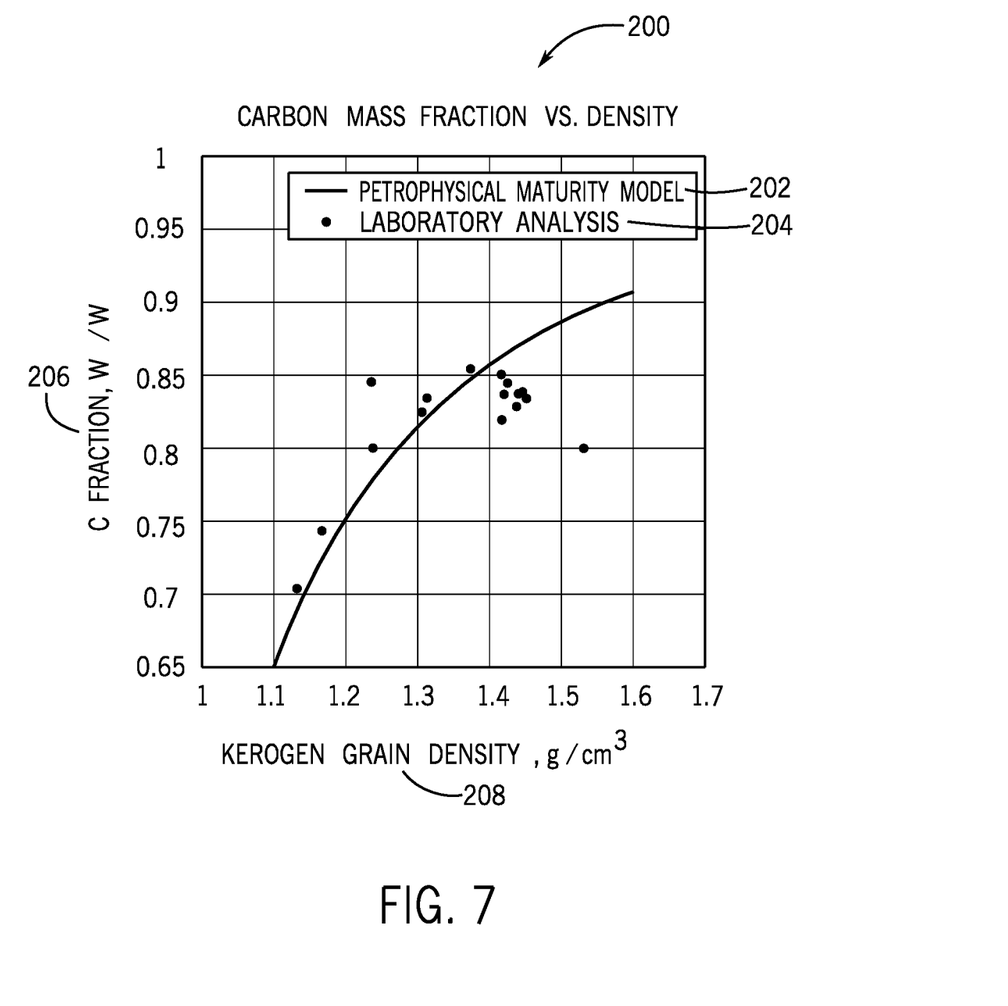
FIG. 7 is a plot diagram illustrating a correlation between C concentration (mass fraction) and density of kerogen useful in maturity inversion, in accordance with an embodiment.

Similarly, the kerogen density may be related to the maximal carbon fraction through the selected Van Krevelen plot pathway (e.g., pathway 154 of FIG. 4) (block 128). FIG. 7 is a plot diagram illustrating a model 202 providing the correlation between hydrogen concentration (mass fraction 206) and density of kerogen 208 useful in maturity inversion, in accordance with an embodiment. In one embodiment, the function for providing the derivation of the carbon fraction may be represented as:

$$\chi_K = 0.95 - 0.3 e^{-4(\rho_K - 1.1)}$$

$\chi_K$ represents the carbon mass fraction in the kerogen. As illustrated in the plot 200, the function 202 closely matches laboratory measurements 204, indicating an accurate function 202.

From there, associated kerogen properties, such as sigma and/or permittivity may be estimated (block 130). In some situations, a primary contributor for the thermal neutron capture cross section in kerogen may be hydrogen. The macroscopic cross section may be derived from the hydrogen mass fractions, via:

$$\Sigma_K = 198.7 \rho_K \xi_K$$

Further, in one embodiment, the kerogen permittivity model may be parameterized by:

$$\varepsilon_K = 7 + 3.5 \tanh\left(\frac{\rho_K - 1.4}{0.1}\right)$$

This representation may account for variation of the atomic composition and kerogen density, by using an atomic polarization sum rule with empirical estimations of the effects of polarizable graphite at high maturity.

In some embodiments, an optional bitumen quantification model may be provided. The bitumen quantification model may account for the presence of bitumen, a semi-solid hydrocarbon product, as a function of maturity. The bitumen may be a varying fraction of the kerogen volume in the formation 14. Two observations may help in determining the bitumen quantification.

First, a correlation between the total organic carbon (TOC) and bound hydrocarbon (e.g., the bitumen) volume may be created based upon laboratory retort measurements. In one embodiment, this correlation my be parameterized by the pyrolysis hydrogen index (100×S2/TOC), as:

$$\frac{\phi_B}{TOC_p} = 0.0024 \cdot S - 10^{-6} \cdot S^2$$

TOCp is the combustion TOC, including just the kerogen contribution to organic carbon, with a matrix plus kerogen mass normalization.

Second, an additional or alternative formulation may be derived using an exponential parameterization, according to:

$$\frac{\phi_B}{\phi_K} = 0.5 e^{\frac{(\rho_K - 1.1)^2}{0.222^2}}$$

This formulation may ease the implementation processing.

The Fluid Hydrocarbon Property Model

Returning to FIGS. 2 and 3, the discussion now turns to application (block 68) of the fluid hydrocarbon property model 96. The fluid hydrocarbon property model 96 may be derived using certain hydrocarbon properties. The hydrogen index of fluid hydrocarbon may be derived according to:

$$HI_{hc} = 9 \rho_{hc} \frac{1.712 - \rho_{hc}}{6.408}$$

However, this may present an inconvenience of proposing the same hydrogen index for different oil types that have high molecular weights. Accordingly, if the oil density is outside of the range encountered in the shale reservoir, this may pose inversion issues. Thus, a modified model may be used to overcome this issue. For example, in one embodiment, the fluid hydrocarbon fraction may be derived from the former model, while using an alkane model for hydrocarbons. Accordingly, the hydrogen index may be derived according to the following model:

$$HI_{hc} = 1.08 \tanh\left(\frac{\rho_{hc}}{0.4893}\right)$$

Additionally or alternatively, the following formula may be used to honor stoichiometric values:

$$\chi_{hc} + 0.75 + 0.15 \times \tan h(\rho_{hc} - 0.1)$$

Further, fluid hydrocarbon sigma may be derived from the hydrogen index, while permittivity may be derived primarily from the density. A model may be derived fro alkane through an atomic polarization model, according to:

$$\varepsilon_{hc} = 1.6 + 1.5(\rho_{hc} - 0.4) + 1.3(\rho_{hc} - 0.4)^2.$$

Maturity Association

In some embodiments, a maturity association 95 may be provided as a constraint. For example, because there is very little direct vertical migration in source rock, there may be an association between the fluid type and the kerogen maturity. This maturity association of fluid hydrocarbon type and kerogen may be parameterized via a relationship between fluid hydrocarbon and kerogen density. For example, such a relationship may be represented by:

$$\rho_{hc} = 0.6 - 0.3 \tanh\left(\frac{\rho_K - 1.4}{0.1}\right)$$

The "gas" endpoint of this equation may vary with reservoir temperature and pressure. Accordingly, adjustments may be warranted for a particular shale play.

Once the maturity models are applied to the log response model, the maturity inversion may be performed to extract output log data 100 (block 70). Efficient inversion parameters may be chosen. For example, in some embodiments sand densities may be chosen as inversion parameters, rather than sand weight fractions or carbon weight fractions. Some parameters may include fractional kerogen volume $\phi_K$ (v/v), fractional hydrocarbon volume $\phi_{hc}$ (v/v), kerogen density $\rho_K$ (g/cc), hydrocarbon density $\rho_{hc}$ (g/cc), and/or fractional water volume $\phi_w$ (v/v).

Multiple mathematical forms may be used in the inversion. In one embodiment, the inversion method may use the quasi Gauss-Newton minimization of a quadratic cost function. The cost function may have three terms: a model mismatch term, a smoothing term, and a maturity association term. Such a function may be represented by:

$$C(p) = \frac{1}{2} \sum_i \left(\frac{L_i - F_i(p)}{\sigma_{L_i}}\right)^2 + \lambda_s \frac{1}{2} \sum_i \left(\frac{p_j - p_j^p}{\sigma_{pj}}\right)^2 + \lambda_c \frac{1}{2} \left(\frac{\rho_{hc} - f_c(\rho_K)}{\sigma_c}\right)^2$$

Maturity Inversion

Figure 11:
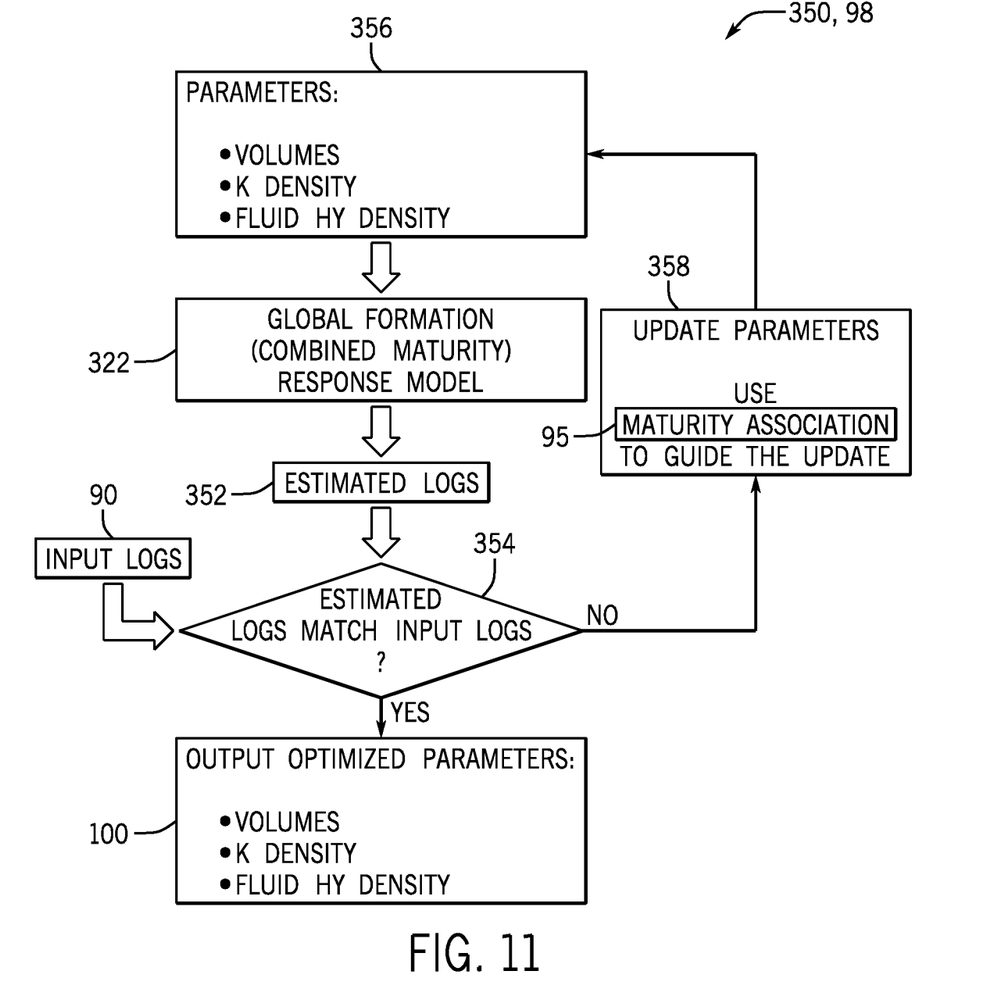
FIG. 11 is a schematic diagram 350 illustrating maturity inversion 98 with optional maturity association 95, in accordance with an embodiment.

FIG. 11 is a schematic diagram 350 illustrating maturity inversion 98 with optional maturity association 95, in accordance with an embodiment. As illustrated, a determination is made as to whether or not data of the input logs 90 match data of the estimated logs 352 (decision block 354). When the data of the input logs 90 and the estimated logs 352 do not match, parameters 356 (e.g., volumes kerogen density, fluid hydrocarbon density, etc.) may be updated using maturity association 95 (block 358). The updated parameters 356 are provided as inputs for the global formation response model 322. Accordingly, updated estimated logs 352 may be derived from the global formation response model 322. This process may continue until the data of the estimated logs 352 mat the input logs 90. When this data matches, optimized output parameters (e.g., volumes kerogen density, fluid hydrocarbon density, etc.) may be outputted (e.g., as output logs 100).

Output Log Data

Figure 8:
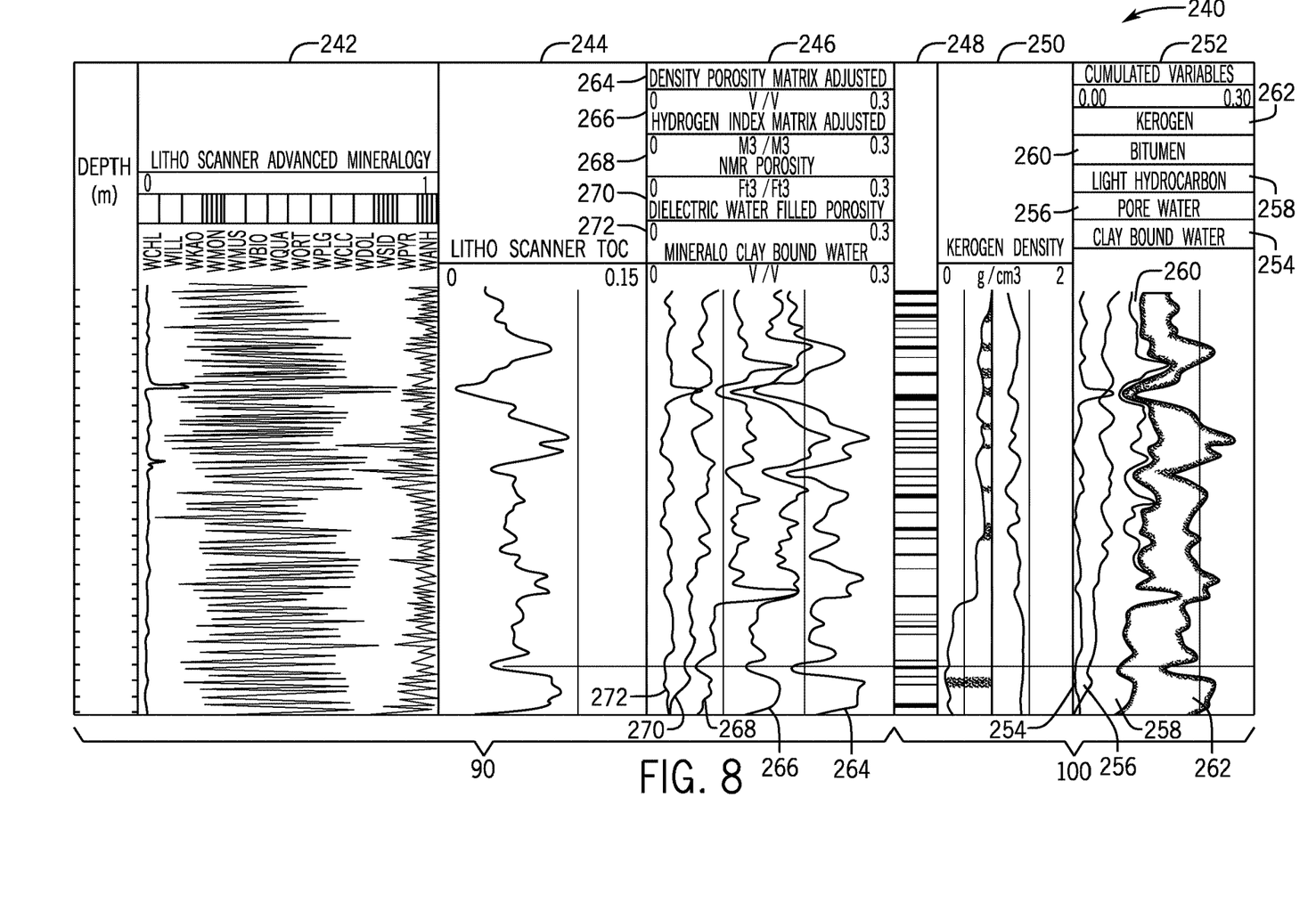
FIG. 8 is a schematic diagram illustrating variable maturity data obtained via maturity inversion, in accordance with an embodiment.

FIG. 8 is a schematic diagram illustrating an example 240 of variable maturity data (e.g., output logs 100) obtained via maturity inversion, in accordance with an embodiment, and includes a first track 242, a second track 244, third track 246, fourth track 248, fifth track 250, and sixth track 252. The first track 242, second track 244, and third track 246 contain the input data 90 (e.g., as applied to the log response model 92). In the first track 242, mineralogical model data in dry weight fraction is extracted from an elemental spectroscopy tool (e.g., of the downhole tool 12). In the second track 244, the total organic carbon (TOC) weight fraction is estimated from the same elemental spectroscopy tool. The third track 246 provides measurements of the different volume estimates from the density measurement 264, thermal neutron hydrogen index 266, nuclear magnetic resonance 268, dielectric dispersion 270, and clay bound water 272 from the mineralogical model.

The fourth track 248, fifth track 250, and sixth track 252 include the maturity inversion outputs. The fourth track 248 may present an output (e.g., color-coding output) that illustrates the fluid hydrocarbon density output when the output logs 100 display color. In some embodiments, the colors may illustrate the relative densities, where light shades represent lower densities and dark shades represent higher densities. In additional or alternative embodiments, a transition from red to green shades may indicate the relative densities. The fifth track 250 includes the fluid hydrocarbon density and the kerogen density, both output from the maturity inversion 98. The sixth track 252 illustrates component volumes, clay bound water 254, water porosity 256, fluid hydrocarbon 258, bitumen 260, and kerogen 262 values that are adjusted based upon the maturity effects (e.g., via the maturity inversion 98). Accordingly, in contrast to the values provided in the third track 246, the values provided in the sixth track 252 may include additional accuracy, by not relying on variables that are fixed according to certain assumptions and/or a-priori information.

By dynamically determining maturity properties at various depths of the wellbore 16, additional accuracy of the variable maturity properties may be obtained. As a result, wellbore 16 evaluation may be positively impacted, enabling decision makers to manage the wellbore 16 to more effectively produce hydrocarbons, complete the well, or perform any other suitable wellbore 16 management.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
   when a downhole logging tool is at a plurality of desired logging depths of a borehole in a formation, obtaining input log data via the downhole logging tool;
   obtaining, via a data processing system communicatively coupled to the downhole logging tool, a log response by applying the input log data to a log response model;
   applying, via the data processing system, at least one maturity model to the log response;
   performing, via the data processing system, a maturity inversion to extract dynamic maturity-based properties associated with the formation at the plurality of desired logging depths from the input log data, wherein the maturity inversion is performed based on a minimization of a cost defined by dynamic parameters, wherein the maturity inversion comprises:
      comparing the input log data to estimated log data derived from a model using the dynamic parameters, wherein the dynamic parameters comprise one or more of a fractional kerogen volume, a fractional hydrocarbon volume, a kerogen density, a hydrocarbon density, and a fractional water volume;
      determining whether the estimated log data is within a threshold level of match of the input log data;
      iteratively, while the estimated log data is not within the threshold level of match of the input log data, adjusting the dynamic parameters to generate updated dynamic parameters, wherein the updated dynamic parameters comprise one or more of an updated fractional kerogen volume, an updated fractional hydrocarbon volume, an updated kerogen density, an updated hydrocarbon density, and an updated fractional water volume; and
      once the estimated log data is within the threshold level of match of the input log data, setting the updated dynamic parameters as the dynamic maturity-based properties;
   providing, via the data processing system, the maturity-based properties in an output log, and
   performing, via the data processing system and the downhole logging tool, a subsequent down hole volumetric estimation operation of the formation using the maturity-based properties associated with the formation at the plurality of desired logging depths.

2. The method of claim 1, wherein the at least one maturity model comprises a kerogen maturity property model.

3. The method of claim 1, wherein the kerogen maturity property model comprises a default kerogen maturity property model that is derived at least in part by:
   selecting a maturity path in a Van Krevelen plot;
   relating an atomic hydrogen index to a kerogen density;
   relating the kerogen density to a maximal carbon fraction, using the selected maturity path; and
   estimating kerogen properties based upon kerogen density, the maximal carbon fraction, or both.

4. The method of claim 1, wherein the at least one maturity model comprises a fluid hydrocarbon property model.

5. The method of claim 1, wherein the input log data comprises:
a bulk density;
a hydrogen index;
a nuclear magnetic resonance (NMR) total porosity;
a total organic carbon weight fraction, a water volume;
matrix properties comprising matrix density and the hydrogen index; or
any combination thereof.

6. The method of claim 5, wherein the input log data comprises the bulk density, determined according to:

$$\rho_b = \rho_{ma}*\phi_{ma} + \phi_w\rho_w* + \rho_K*\phi_K + \rho_{hc}*\phi_{hc} + \rho_B*\phi_B,$$

wherein ρb represents the bulk density, ρma represents a density of a mineral matrix, φma represents a fractional volume of the mineral matrix, φw represents a fractional volume of water, ρw represents a density of the water, ρK represents a density of kerogen, φK represents a fractional volume of the kerogen, ρhc represents a density of a light hydrocarbon, φhc represents a fractional volume of the light hydrocarbon, ρB represents a density of bitumen, and φB represents a fractional volume of the bitumen.

7. The method of claim 5, wherein the input log data comprises the hydrogen index, determined according to:

$$HI = \phi_{ma}HI_{ma} + \phi_w HI_W + \phi_K HI_K + \phi_{hc}HI_{hc} + \phi_B HI_B,$$

wherein HI represents the hydrogen index, φma represents a fractional volume of the mineral matrix, HIma represents a hydrogen index of the mineral index, φw represents a fractional volume of water, HIW represents a hydrogen index of the water, φK represents a fractional volume of the kerogen, HIK represents the hydrogen index of the kerogen, φhc represents a fractional volume of light hydrocarbon, HIhc represents a hydrogen index of the light hydrocarbon, φB represents the fractional volume of bitumen, and HIB represents the hydrogen index of the bitumen.

8. The method of claim 5, wherein the input log data comprises the NMR total porosity, determined according to:

$$MRP = \phi_w HI_W + \phi_{hc}HI_{hc} + \lambda\phi_B HI_B,$$

wherein MRP represents the NMR total porosity, φw represents a fractional volume of water, HIW represents a hydrogen index of the water, φhc resents a fractional volume of light hydrocarbon, HIhc represents a hydrogen index of the light hydrocarbon, λ represents a factor accounting for varying amounts of bitumen that may be detected by an NMR tool.

9. The method of claim 1, comprising applying a maturity association between a fluid hydrocarbon type and kerogen.

10. The method of claim 1, wherein the maturity inversion is performed according to a quasi Gauss-Newton minimization of the cost function, wherein the cost function comprises a quadratic cost function, and wherein the quadratic cost function comprising: a model mismatch term, a smoothing term, and a maturity association term.

11. A well-logging system, comprising:
a downhole logging tool configured to capture input log data at a plurality of vertical positions of the downhole logging tool in a borehole of a formation; and
a data processing system, comprising circuitry configured to:
obtain a log response by applying the input log data to a log response model;
apply at least one maturity model to the log response;
perform a maturity inversion using the input log data to extract maturity-based properties associated with the formation at the plurality of vertical positions from the input log data, wherein the maturity inversion is performed based on a minimization of a cost defined by dynamic parameters, wherein the maturity inversion comprises:
comparing the input log data to estimated log data derived from a model using the dynamic parameters, wherein the dynamic parameters comprise one or more of a fractional kerogen volume, a fractional hydrocarbon volume, a kerogen density, a hydrocarbon density, and a fractional water volume;
determining whether the estimated log data is within a threshold level of match of the input log data;
iteratively, while the estimated log data is not within the threshold level of match of the input log data, adjusting the dynamic parameters to generate updated dynamic parameters, wherein the updated dynamic parameters comprise one or more of an updated fractional kerogen volume, an updated fractional hydrocarbon volume, an updated kerogen density, an updated hydrocarbon density, and an updated fractional water volume; and
once the estimated log data is within the threshold level of match of the input log data, setting the updated dynamic parameters as the maturity-based properties; and
provide the maturity-based properties in an output log; and
enable a subsequent down hole volumetric estimation operation of the formation using the maturity-based properties associated with the formation at the plurality of vertical positions of the borehole.

12. The well-logging system of claim 11, wherein the at least one maturity model comprises: a kerogen maturity property model and a fluid hydrocarbon property model.

13. The well-logging system of claim 12, wherein the circuitry of the data processing system is configured to provide maturity association between the kerogen maturity property model and the fluid hydrocarbon property model.

14. The well-logging system of claim 11, wherein the output log comprises a color-coding that illustrates a fluid hydrocarbon density output that compensates for formation maturity.

15. A tangible, non-transitory, machine-readable medium, comprising machine readable instructions to:
obtain a log response by applying input log data, acquired from a downhole logging tool at a plurality of vertical positions of a borehole of a formation, to a log response model;
apply at least one maturity model to the log response;
perform a maturity inversion using the input log data to extract maturity-based properties associated with the formation at the plurality of vertical positions of the borehole from the input log data, wherein the maturity inversion is performed based on a minimization of a cost defined by dynamic parameters, wherein the maturity inversion comprises:
comparing the input log data to estimated log data derived from a model using the dynamic parameters, wherein the dynamic parameters comprise one or more of a fractional kerogen volume, a fractional hydrocarbon volume, a kerogen density, a hydrocarbon density, and a fractional water volume;
determining whether the estimated log data is within a threshold level of match of the input log data;

iteratively, while the estimated log data is not within the threshold level of match of the input log data, adjusting the dynamic parameters to generate updated dynamic parameters, wherein the updated dynamic parameters comprise one or more of an updated fractional kerogen volume, an updated fractional hydrocarbon volume, an updated kerogen density, an updated hydrocarbon density, and an updated fractional water volume; and once the estimated log data is within the threshold level of match of the input log data, setting the updated dynamic parameters as the maturity-based properties; and provide the maturity-based properties in an output log to enable a subsequent down hole volumetric estimation operation of the formation the maturity-based properties associated with the formation at the plurality of vertical positions of the borehole.

16. The machine-readable medium of claim 15, comprising instructions to:

provide values of s fluid hydrocarbon density and a kerogen density, wherein the values of the fluid hydrocarbon density and the kerogen density are both output from the maturity inversion.

17. The machine-readable medium of claim 15, comprising instructions to:

provide component volumes, clay bound water, pour water, fluid hydrocarbon, bitumen, and kerogen values that are adjusted based upon maturity effects determined by the maturity inversion.

18. The machine-readable medium of claim 15, wherein the downhole logging tool comprises the machine-readable medium.

19. The machine-readable medium of claim 15, comprising instructions to:

determine whether water volume inputs of the input log data is derived from dielectric dispersion;

when the water volume inputs are derived from dielectric dispersion, performing the maturity inversion based at least upon a petrophysical model, kerogen permittivity, mineral matrix permittivity, and water salinity.

* * * * *